United States Patent [19]
Shin

[11] Patent Number: 5,335,110
[45] Date of Patent: Aug. 2, 1994

[54] STEREO MULTI-VISION SCOPE FOR SIGHTSEEING

[76] Inventor: Suk K. Shin, 107-80 Hhun ger-Dong, Seo dae moon-ku, Seoul, Rep. of Korea

[21] Appl. No.: 990,042

[22] Filed: Dec. 14, 1992

[30] Foreign Application Priority Data

Jan. 25, 1992 [KR] Rep. of Korea ............... 1113

[51] Int. Cl.$^5$ ................ G02B 3/08; G02B 27/22; G02B 27/12
[52] U.S. Cl. ................. 359/480; 359/473; 359/618; 359/742
[58] Field of Search ............. 359/480, 481, 473, 412, 359/407, 417, 618, 619, 625, 678, 742, 741

[56] References Cited

U.S. PATENT DOCUMENTS

| | | | |
|---|---|---|---|
| 395,872 | 1/1889 | Briggs | 359/480 |
| 631,227 | 8/1899 | Peppard | 359/480 |
| 3,523,375 | 8/1970 | Frith et al. | 359/480 |
| 3,549,302 | 12/1970 | Fraige | 359/481 |
| 4,960,326 | 10/1990 | Dauvergne | 359/741 |
| 4,986,644 | 1/1991 | Yang | 359/417 |

FOREIGN PATENT DOCUMENTS 889482  2/1962  United Kingdom ............... 359/473

*Primary Examiner*—Jon W. Henry
*Attorney, Agent, or Firm*—McGlew and Tuttle

[57] ABSTRACT

Stereo multi-vision scope with a pair of visual corn type tubes having an ocular portions and a pair of objects portions such as a conventional binocular type.

The ocular portions have not optical lens and the objects portions have multi-image lenses to make a multitude of stereo visual image for viewing distant objects through it.

The corn type tubes also have extension and shortening structure to control their respective distance or width in a horizontal state or position.

8 Claims, 3 Drawing Sheets

STEREO MULTI-VISION SCOPE FOR SIGHTSEEING

FIELD OF THE INVENTION

The present invention relates to a tubular optical instruments of a portable type, and more particularly, to a binocular having a pair of multi-image lenses which can provides a spectator with a number of stereo images of all object as sighted.

BACKGROUND OF THE INVENTION

Multi-image lenses consisting of a number of multilateral facets have been utilized photography imaging systems to use optical effects caused by the different refractive indices of said facets, each of which is a lens. Thereby obtaining artistic and attractive photos of magic-like images of all object of shooting or viewing.

As far as the applicant knows, however, those multi-image lenses have not yet been used as objective lenses of binoculars, since these binoculars have been heretofore generally utilized to enhance enjoyment of theater, sports, events and the like.

In these above conventional arts, the binoculars give a user satisfaction of viewing distant objects, and the magic glass provides an amusement that can feel curiosity and marveling through it.

Another conventional art is an optical instrument which comprises one multi-image lens for taking photographs with a camera.

However, these conventional arts have never provided a user with a further varying viewing environment. That is, visualizing a multitude of stereo visual images when seeing distant objects through a visual instruments.

Furthermore, because they do not provide this environment, it is not desirable.

SUMMARY OF THE PRESENT INVENTION

It is all object of the present invention to provide a binocular (hereinafter, it is described as a stereo multi-vision scope) for viewing a multitude of visual image when viewing distant objects.

It is another object to provide a stereo multi-vision scope which is able to give amusement to people while viewing distant objects thereby on sightseeing.

It is another object to provide a multi-vision binocular which is able to avoid a feeling of monotony while people view distant objects.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
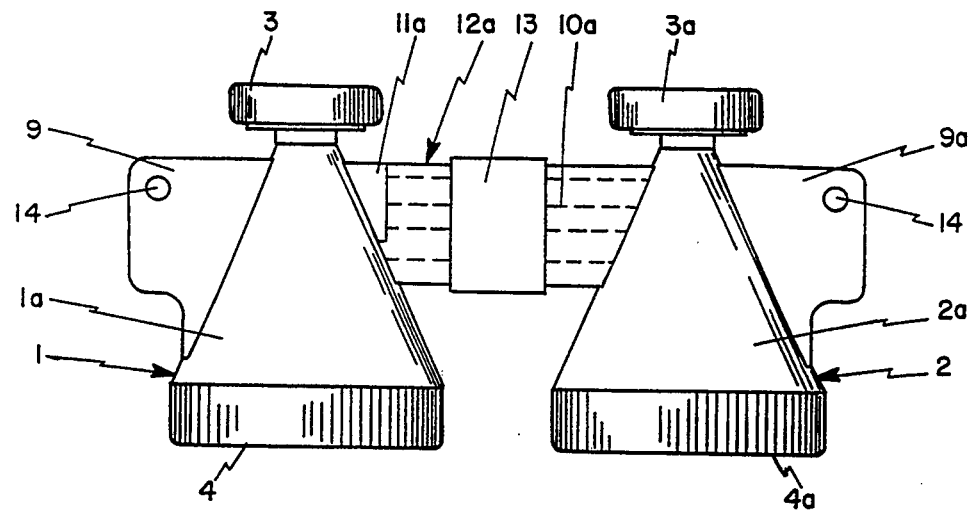
FIG. 1 is a plan view of the present invention.

With respect to the drawings, FIG. 1 shows a view of the present invention with visual cone type tubes 1,2 and a horizontal supports means to maintain horizontally the two cone type tubes 1,2 in the manner of a conventional binocular.

Figure 4:
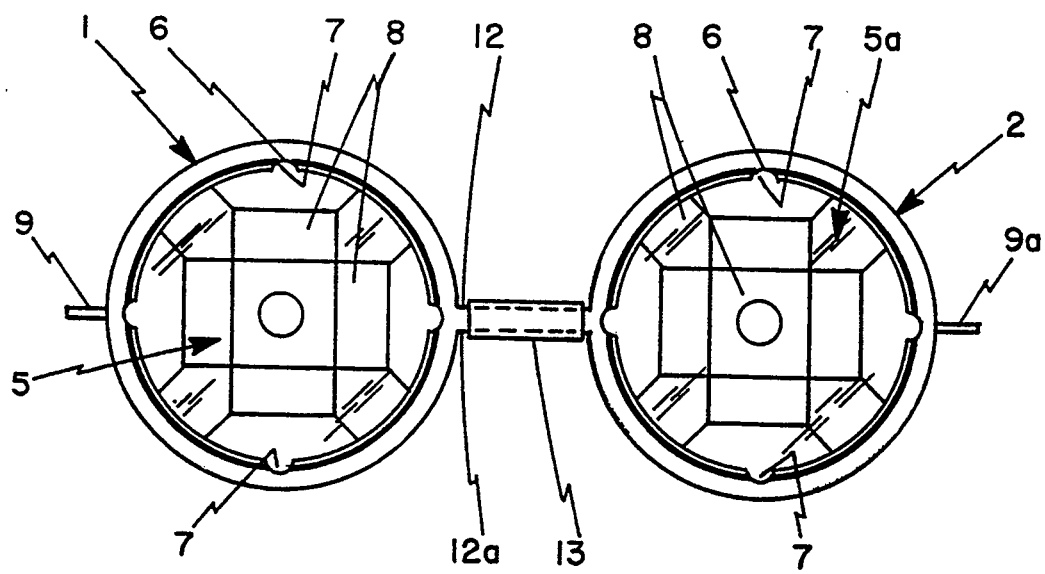
FIG. 4 is a rear elevation view of the present invention.
Figure 5:
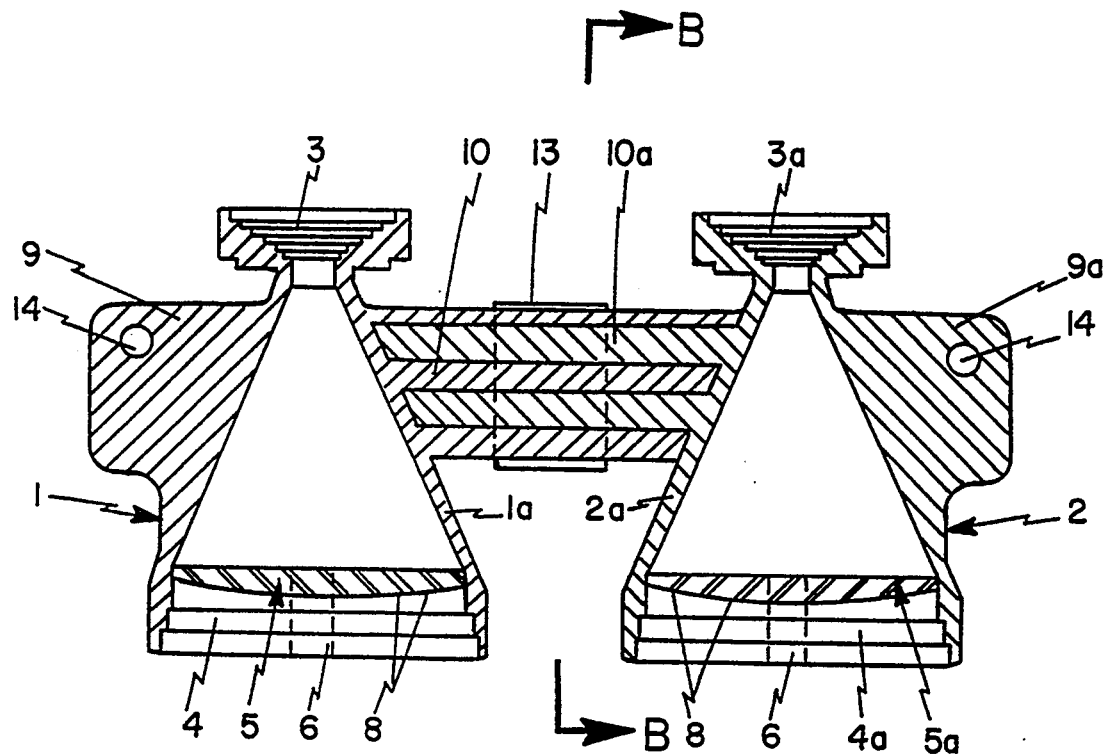
FIG. 5 is a sectional view of the present invention taken along line A—A in FIG. 3.
Figure 6:
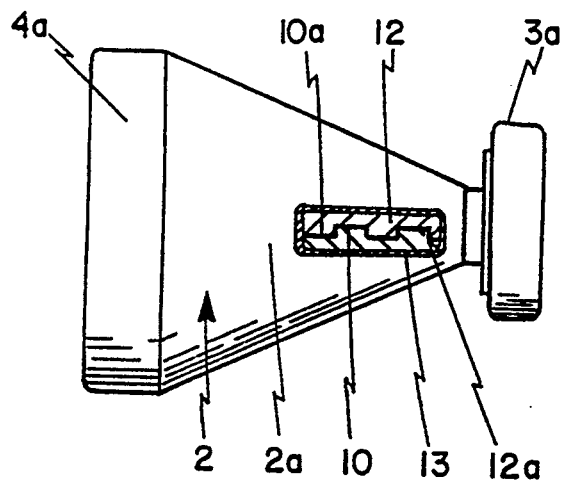
FIG. 6 is a sectional view of the present invention taken along line B—B in FIG. 6.

The visual cone type tubes 1,2 have a pair of ocular portions 3,3a to be placed near the two eyes of a user and a pair of object portions 4,4a for distant objects as shown in FIG. 4 and FIG. 6.

The ocular portions 3,3a do not have installed optical lenses, but object portions 4,4a respectively are installed with multi-image lenses 5,5a to cause a multitude of visual images of distant objects to be received into the opening sides of the object portions 4,4a.

The multi-image lenses 5,5a have a seeing-through slopes 8 respectively formed with a number of regularly patterned surfaces wholly on its flat. The multi-image lenses 5,5a also have a number of fixing projections 7 on the rim of the multi-image lenses 5,5a, to install the multi-image lenses 5,5a into the opening sides of the object portions 4,4a.

A number of fixing grooves 6 horizontally maintain the multi-image lenses 5,5a and are formed onto the inner side of object portions 4,4a in correspondence to the respectively fixing projection 7.

Both fixing projections 7 and fixing grooves 6 are used to joint or to separate each of multi-image lenses 5,5a to the opening sides of the object partitions 4,4a.

The cone type tubes 1,2 can be entirely membered or connected by fixing support means in order to be able to be maintained horizontally as a binocular types. They are also capable of having an extending and shortening support means to extend and to shorten the cone type visual tubes 1,2 in the horizontal direction as shown in FIG. 1 and FIG. 2.

The extending and shortening support means for the horizontal direction is formed by two separable cone type tubes 1,2 and they comprise extending and shortening support frames 12,12a having evenness faces 10,10a which are mutually overlapped at a frame and a support cap 13 to join the extending and shortening support frames 12,12a.

Figure 2:
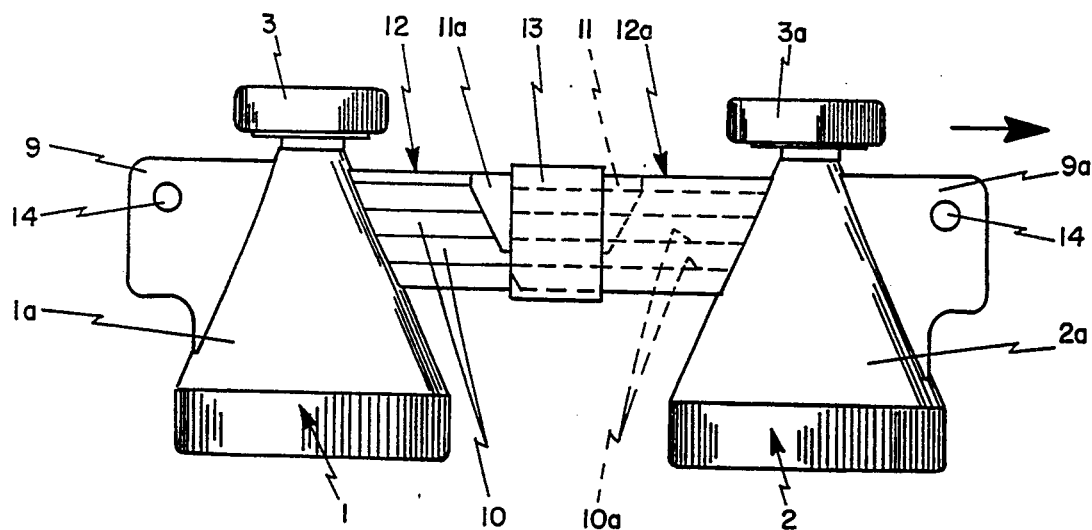
FIG. 2 is a bottom view of the present invention.
Figure 3:
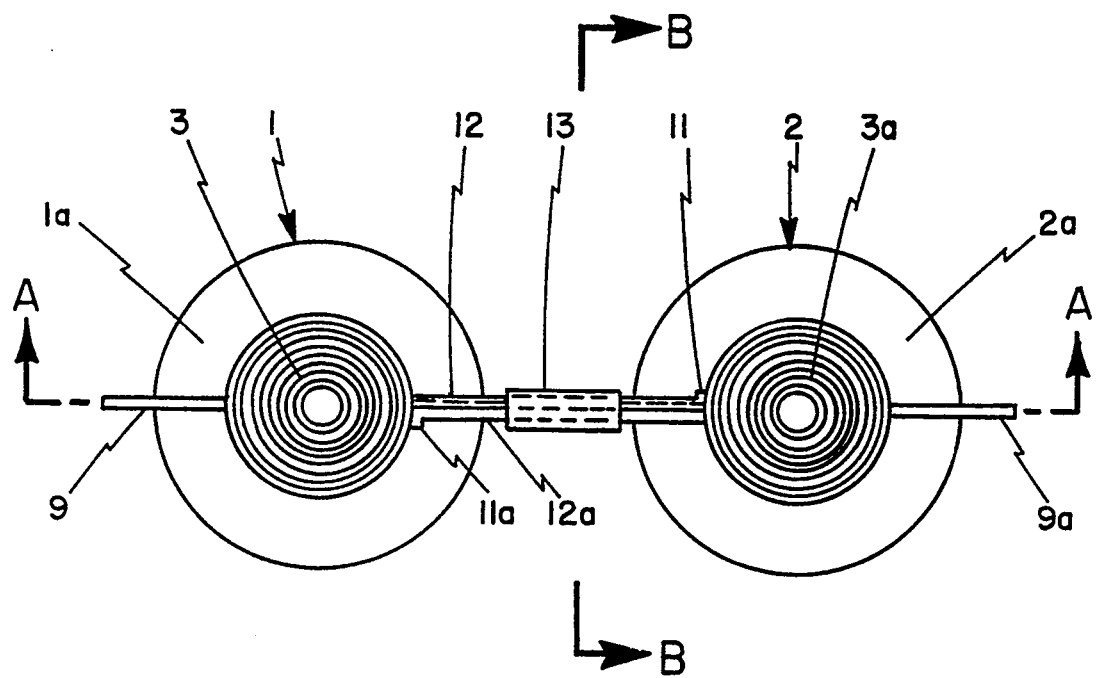
FIG. 3 is a front elevation view of the present invention.

The frames 12,12a respectively have hooked projections 11,11a not capable of being separated from the support cap 13 as shown in FIG. 1 and FIG. 2.

The cone type visual tubes 1,2 respectively have handle portions 9,9a to use for grasping body, and the handle portions 9,9a also have respectively binding holes 14 to hang a string or cord.

Giving an explanation of the effect of the present invention constituted in such a manner, it is follows.

To use the present invention, the user grasps the handle portions 9,9a of the visual cone type tubes 1,2 and the user brings the sides of ocular portions 3,3a to her/his eyes in such as a manner as in using a conventional binocular.

Thereafter, the user can be seen to desiring distant objects by himself.

The user is able to view distant objects thereby as a multitude of stereo visual image of a successfully homogenous type in respectively separable figures for distant objects. The multitude of visual images is able to be viewed as stereo effect itself by the pair of eyes.

When the width of the cone type tubes 1,2 is smaller or larger than the distant width of the two eyes, the width of the cone type tubes is able to be controlled to an adaptable distance by means of the extending and shortening means 11,11a,12,12a,13 which can be moved in a horizontal direction.

In such a state, the extending and shortening frames 12,12a of the extending and shortening means are respectively able to be moved horizontal toward the left or the right direction from a central point. At this time, the extending and shortening frames 12,12a are mutually overlapped by a number of evenness faces 10,10a.

Then the hooked projections 11,11a in FIG. 1 and FIG. 2 constrain to not separate each of the extending and shortening frames 12,12a from the support cap 13.

When desired, the extending and shortening frames 12,12a can be separated from the support cap 13. The user respectively pulls the extending and shortening frames 12,12a toward the outer direction with a strong manual force. The hooked projections 11,11a deviate or separate from support cap 13 owing to the manual force of the user being stronger than an elastic force of the plastics.

When they are to be mutually assembled, the hooked projections 11,11a are to be positioned at opening sides of support cap 13. Thereafter, they are pushed toward a respective inner direction of themselves.

As described hereinabove, the present stereo multi-vision scope is able to provide an easiness for using multi-image lenses and a convenience in its maintenance, management, handling . . . etc, because its structure is formed of an assemble and disassemble type in the essential parts.

Also, the present invention is able to provide a variable environment for viewing a sightseeing, leisure, water-sightseeing, etc, and it can be used with an independent visual tube in disassembly mode, for two people.

While a specific embodiment of the invention has been shown and described in detail to illustrate the application of the principles of the invention, it will be understood that the invention may be embodied otherwise without departing from such principles.

What is claimed is:

1. A stereo multi-vision scope comprising:
   first and second cone-type tubes, each of said first and second cone-type tubes having art ocular portion at one end and an object portion at another end, each of said object portions including a multi-image means for viewing distant objects as a multitude of visual images when looking through said ocular portions, each of said ocular portions having a shape for viewing through respective said first and second corn-type tubes when said ocular portions are held to eyes of a user:
   support means for connecting said first and second cone-type tubes and for adjusting a distance between said first and second corn type tubes to have said distance substantially equal a distance between the eyes of the user.

2. A stereo multi-vision scope in accordance with claim 1, wherein:
   said support means includes first and second frames attached to respective said first and second cone-type tubes, said support means also including cap means for connecting and disconnecting said first and second frames from each other.

3. A stereo multi-vision scope in accordance with claim 2, wherein:
   said cap means disconnects said frames when over extending said frames with a force greater than a force needed to adjust said distance between said first and second cone-type tubes.

4. A stereo multi-vision scope in accordance with claim 1, wherein:
   said multi-image means includes a multi-image lens with a plurality of surfaces, each of said plurality of surfaces providing an image.

5. A stereo multi-vision scope comprising:
   first and second cone-type tubes, each of said first and second cone-type tubes having an ocular portion at one end and an object portion at another end, each of said object portions including a multi-image means for viewing distant objects as a multitude of visual images when looking through said ocular portions, each of said ocular portions having a shape for viewing through respective said first and second cone-type tubes when said ocular portions are held to eyes of a user;
   support means for connecting said first and second cone-type tubes and for adjusting a distance between said first and second type tubes to have said distance substantially equal a distance between the eyes of the user, said support means includes first and second frames attached to respective said first and second cone-type tubes, said support means also including cap means for connecting and disconnecting said first and second frames from each other.

6. A stereo multi-vision scope in accordance with claim 5, wherein:
   said cap means disconnects said frames when over extending said frames with a force greater than a force needed to adjust said distance between said first and second cone-type tubes.

7. A stereo multi-vision scope in accordance with claim 1, wherein:
   said support means adjusts said distance between said first and second cone-type tubes by sliding said first and second frames toward and away from each other.

8. A stereo multi-vision scope in accordance with claim 1, wherein:
   said multi-image means includes a lens with a substantially flat side facing said ocular portion, said lens having a convex side substantially opposite said flat side, and said convex side having a plurality of slopes.

* * * * *